US012080976B2

(12) United States Patent
Lee et al.

(10) Patent No.: US 12,080,976 B2
(45) Date of Patent: Sep. 3, 2024

(54) ELECTRONIC DEVICE WITH DETACHABLE PLUG

(71) Applicant: Chicony Power Technology Co., Ltd., New Taipei (TW)

(72) Inventors: Po-Sheng Lee, New Taipei (TW); Fu-Teng Hou, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 382 days.

(21) Appl. No.: 17/717,157

(22) Filed: Apr. 11, 2022

(65) Prior Publication Data

US 2023/0136225 A1 May 4, 2023

(30) Foreign Application Priority Data

Oct. 28, 2021 (TW) ................................ 110140159

(51) Int. Cl.
*H01R 13/02* (2006.01)
*H01R 13/66* (2006.01)
(Continued)

(52) U.S. Cl.
CPC ......... *H01R 13/6675* (2013.01); *H01R 13/02* (2013.01); *H01R 24/68* (2013.01); *H01R 31/065* (2013.01)

(58) Field of Classification Search
None
See application file for complete search history.

(56) References Cited

U.S. PATENT DOCUMENTS 5,848,907 A * 12/1998 Chen ...................... H01R 27/00 439/518
7,547,219 B2 * 6/2009 Zhuge .................. H01R 31/065 439/173
(Continued)

FOREIGN PATENT DOCUMENTS

CN 2807553 8/2006
CN 204304171 4/2015
(Continued)

OTHER PUBLICATIONS

Office Action of Taiwan Counterpart Application, issued on Jun. 28, 2022, pp. 1-5.
(Continued)

*Primary Examiner* — Tho D Ta
(74) *Attorney, Agent, or Firm* — JCIPRNET

(57) ABSTRACT

An electronic device with a detachable plug includes a main body and a plug body. The main body has a fitting recess, a first conductive terminal group, and a press portion. The first conductive terminal group is disposed in the fitting recess. The press portion is located on at least one side of the fitting recess, and the press portion is formed by at least one exterior side plate and at least one interior side plate of the main body together. A press space exists between the at least one exterior side plate and the at least one interior side plate. The at least one interior side plate has an opening communicating with the fitting recess, and the at least one exterior side plate has a bump passing through the opening. The plug body is detachably configured in the fitting recess of the main body.

15 Claims, 20 Drawing Sheets

(51) Int. Cl.
*H01R 24/68* (2011.01)
*H01R 31/06* (2006.01)

(56) References Cited

U.S. PATENT DOCUMENTS 7,654,838 B1 * 2/2010 Zhuge .................... H01R 27/00 439/173
8,251,718 B2 * 8/2012 Chen ...................... H01R 31/06 439/131
8,382,526 B2 * 2/2013 Chen .................... H01R 13/639 439/655
8,465,307 B2 * 6/2013 Shieh ..................... H01R 31/06 439/173
9,112,326 B2 * 8/2015 Liu ........................ H01R 24/68
9,985,397 B2 * 5/2018 Jiang .................. H01R 13/6675
10,944,276 B2 3/2021 Smith
2010/0062652 A1 * 3/2010 Liu ........................ H01R 31/06 439/660
2020/0395770 A1 * 12/2020 Hsu ........................... H02J 7/00
2021/0217506 A1 7/2021 Chen et al.

FOREIGN PATENT DOCUMENTS

| | | |
|---|---|---|
| CN | 212257915 | 12/2020 |
| KR | 1019980037467 | 8/1998 |
| KR | 1020170072184 | 6/2017 |
| TW | M367494 | 10/2009 |
| TW | M440561 | 11/2012 |
| TW | M575204 | 3/2019 |
| TW | M587373 | 12/2019 |

OTHER PUBLICATIONS

"Office Action of Korea Counterpart Application", with English translation thereof, issued on Jan. 23, 2024, p. 1-p. 8.

* cited by examiner

ELECTRONIC DEVICE WITH DETACHABLE PLUG

CROSS-REFERENCE TO RELATED APPLICATION

This application claims the priority benefit of Taiwan application serial no. 110140159, filed on Oct. 28, 2021. The entirety of the above-mentioned patent application is hereby incorporated by reference herein and made a part of this specification.

BACKGROUND

Technical Field

The disclosure relates to an electronic device, and more particularly to an electronic device with a detachable plug that may replace plugs of different specifications.

Description of Related Art

Existing consumer electronic products such as notebook computers, tablet computers, and smartphones have become indispensable tools in daily life for shopping, booking, social communication, online meetings, and the like. Generally speaking, an electronic product is charged or powered by being connected to mains through a power converter, which rectifies and transforms the mains into direct current suitable for the electronic product.

The traditional power converter includes a plug for being plugged into a mains socket to have connection with the mains for transformation and rectification. However, mains socket specifications vary between countries around the world. Since the plugs of the existing power converters are fixed, corresponding adapters are required to be connected with the existing power converters to adapt to mains sockets of different specifications, which causes inconvenience in use.

SUMMARY

The disclosure provides an electronic device with a detachable plug, which is an electronic device adapted to replace plug bodies of different specifications to be applicable to mains sockets of different specifications.

The electronic device with the detachable plug of the disclosure includes a main body and a plug body. The main body has a fitting recess, a first conductive terminal group, and a press portion. The first conductive terminal group is disposed in the fitting recess. The press portion is located on at least one side of the fitting recess, and the press portion is formed by at least one exterior side plate and at least one interior side plate of the main body together. A press space exists between the at least one exterior side plate and the at least one interior side plate. The at least one interior side plate has an opening communicating with the fitting recess, and the at least one exterior side plate has a bump passing through the opening. The plug body is detachably configured in the fitting recess of the main body, and the plug body has a power pin group and a second conductive terminal group. The power pin group protrudes from a top surface of the plug body. The second conductive terminal group is configured in the plug body and is electrically coupled to the power pin group. The first conductive terminal group is adapted to pass through the plug body and be coupled with the second conductive terminal group to accommodate the plug body in the fitting recess.

The electronic device with the detachable plug of the disclosure includes a main body and a plug body. The main body includes a plug assembly and a casing. The plug assembly has a fitting recess and a first conductive terminal group. The first conductive terminal group is disposed in the fitting recess. At least one first side plate of the plug assembly has an opening communicating with the fitting recess. The casing has a hole. The plug assembly is configured in the hole and is combined with the casing. At least one second side plate of the casing has a bump. When the plug assembly is combined with the casing, the bump passes through the opening, and between the at least one first side plate and the at least one second side plate is a press space. The plug body is detachably configured in the fitting recess of the plug assembly, and the plug body includes a power pin group and a second conductive terminal group. The power pin group protrudes from a top surface of the plug body. The second conductive terminal group is configured in the plug body and is electrically coupled to the power pin group.

Based on the above, the electronic device with the detachable plug of the disclosure has the plug body detachably configured in the fitting recess of the main body and may thus replace plug bodies of different specifications to be applicable to mains sockets of different specifications. In addition, the main body and the plug body of the disclosure adopt a hidden connection structure, which may improve product appearance and reduce water ingress.

DESCRIPTION OF THE EMBODIMENTS

Figure 1A:
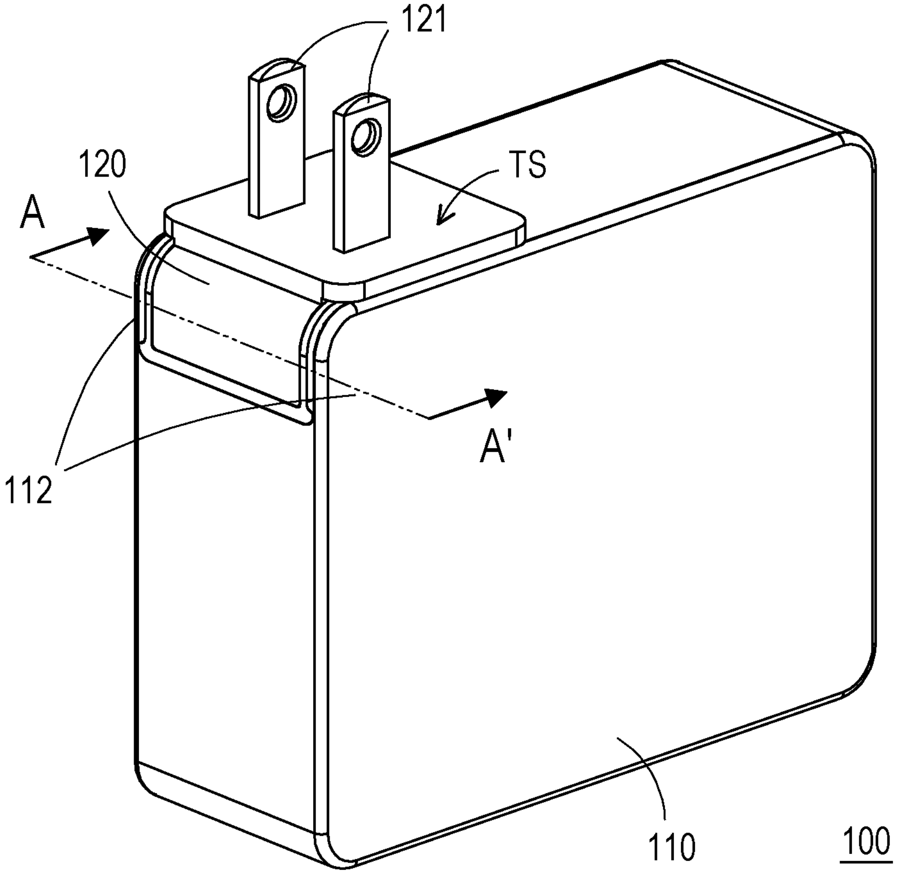
FIG. 1A is a schematic perspective view of an electronic device with a detachable plug according to an embodiment of the disclosure.
Figure 1B:
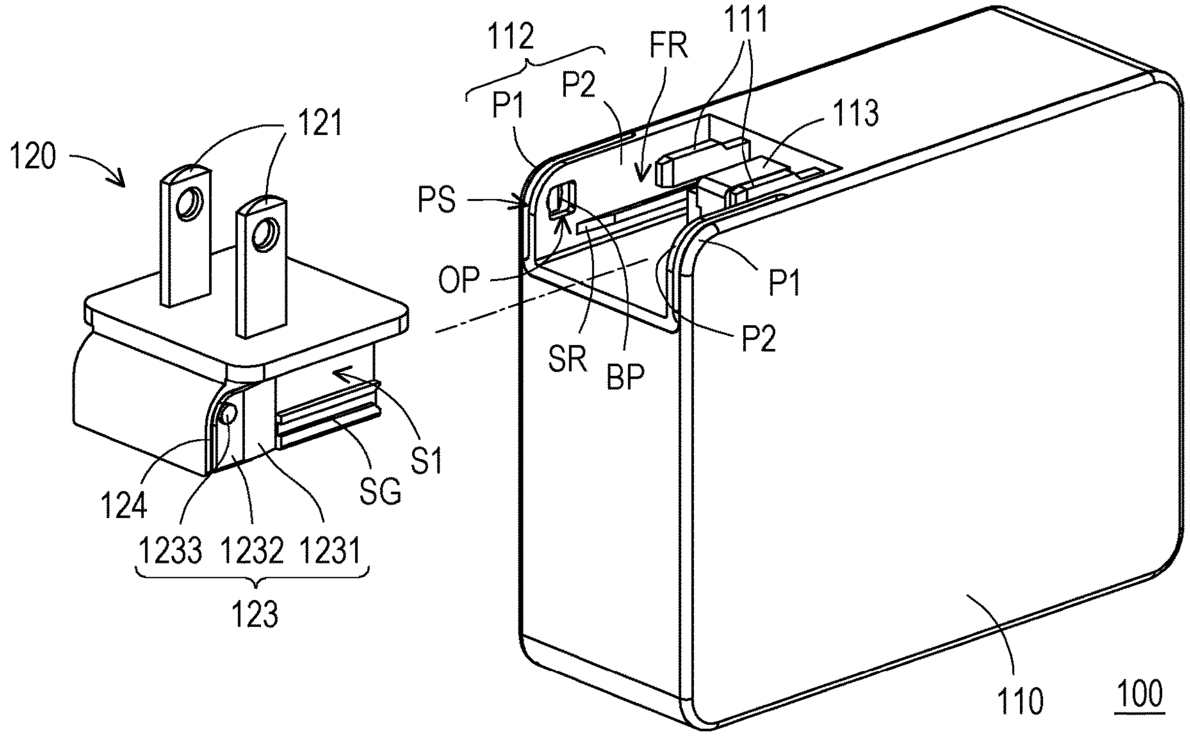
FIG. 1B is a schematic exploded view of the electronic device with the detachable plug in FIG. 1A.

FIG. 1A is a schematic perspective view of an electronic device with a detachable plug according to an embodiment of the disclosure. FIG. 1B is a schematic exploded view of the electronic device with the detachable plug in FIG. 1A.

With reference to FIG. 1A and FIG. 1B, an electronic device 100 with a detachable plug of the disclosure is adapted to be connected to a mains socket and serve as a power conversion adapter for connection with a consumer electronic product or an electronic apparatus. The electronic device 100 with the detachable plug is adapted to convert external power into voltage and current values of corresponding specifications after transformation and rectification to supply an electronic product or an electronic instrument with power.

Figure 1C:
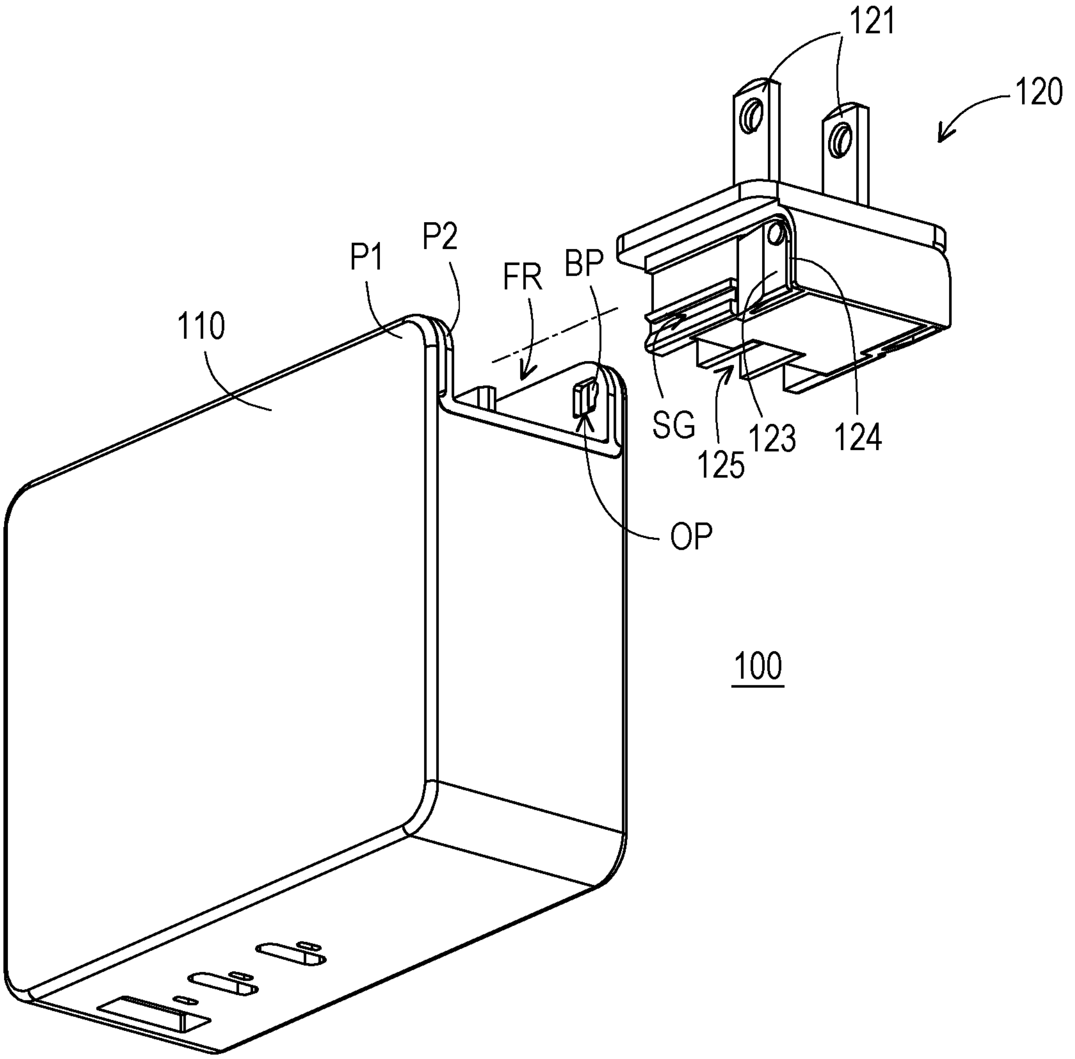
FIG. 1C is a schematic exploded view of the electronic device with the detachable plug in FIG. 1A from another viewing angle.
Figure 1D:
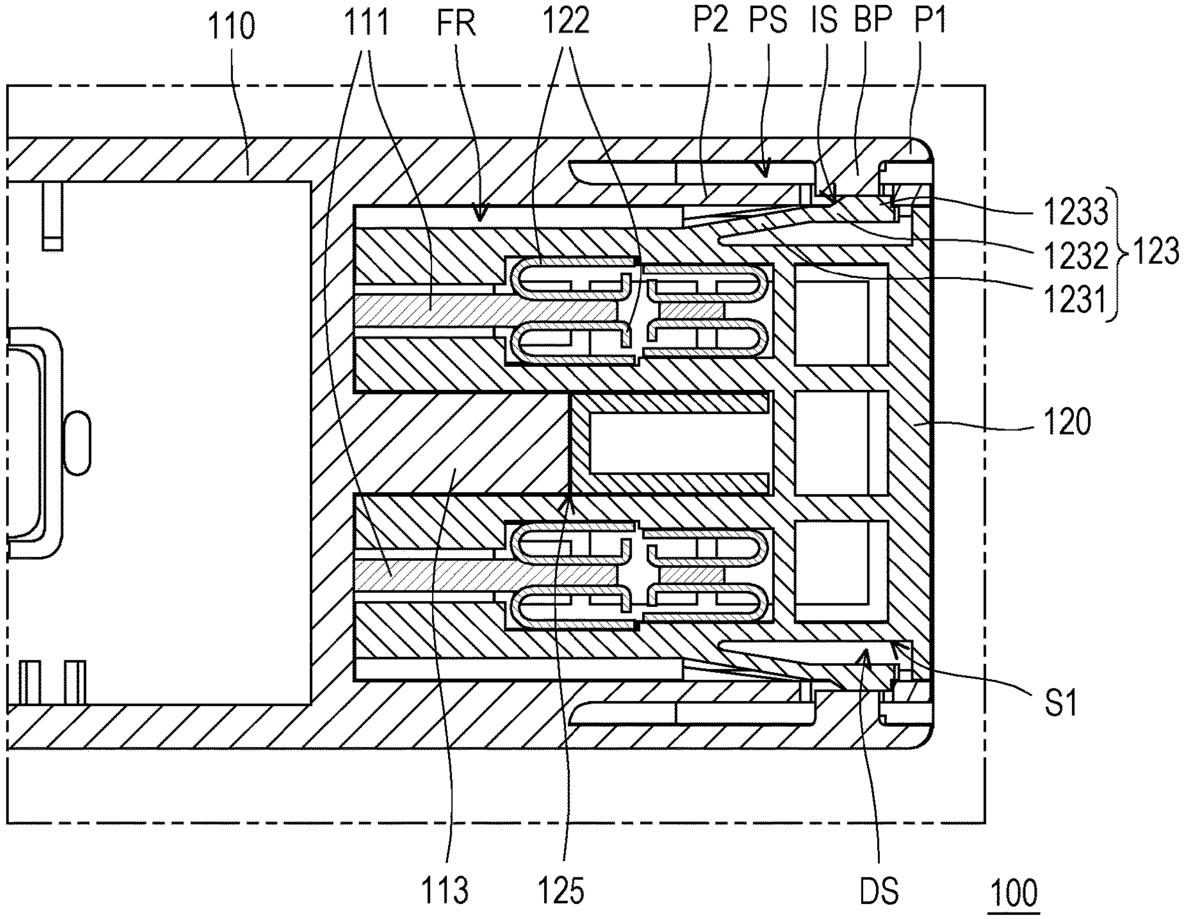
FIG. 1D is a schematic partial cross-sectional view of the electronic device with the detachable plug in FIG. 1A taken along a section line A-A'.
Figure 1E:
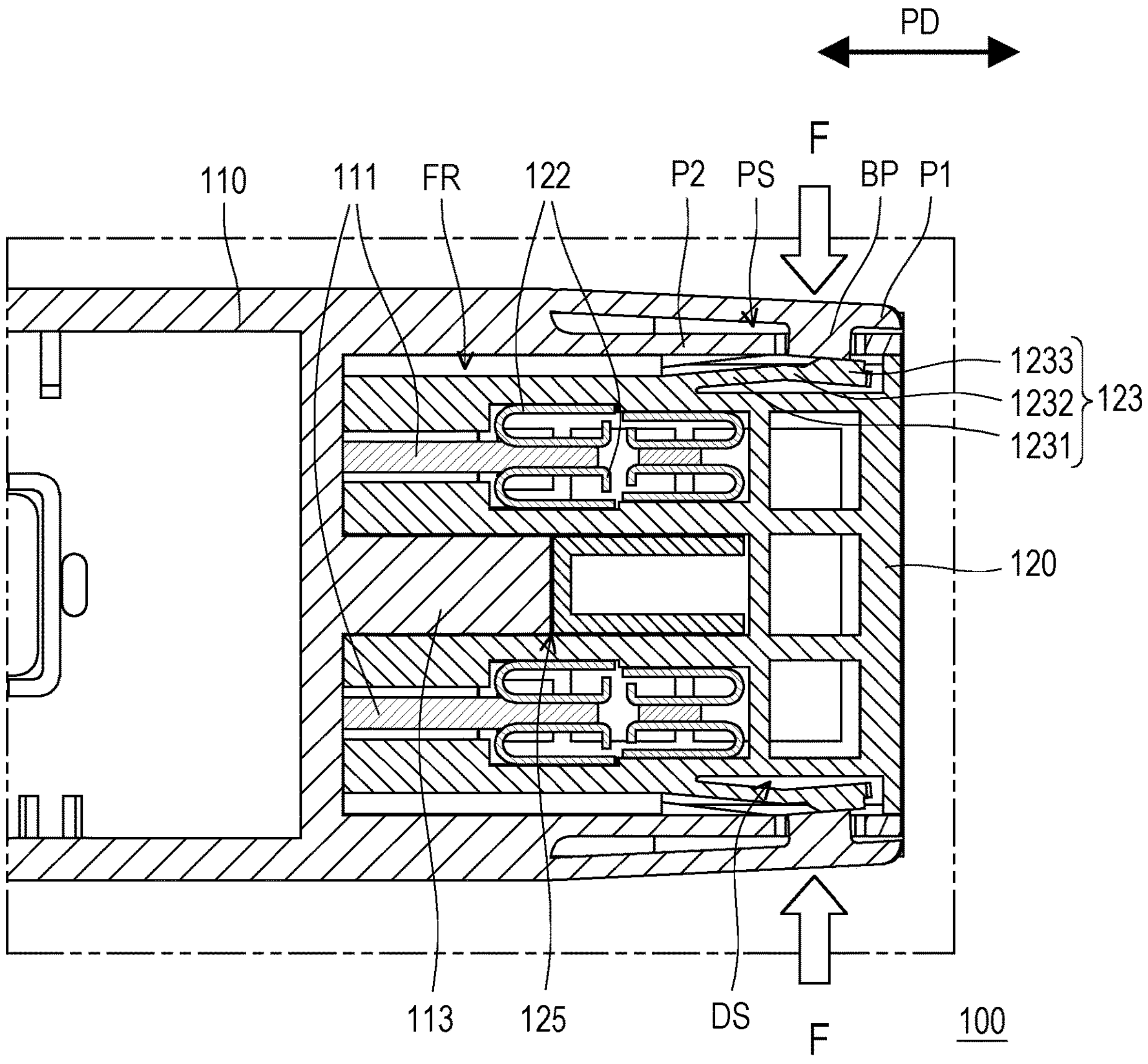
FIG. 1E is a schematic view of a press action of the electronic device with the detachable plug of FIG. 1D.
Figure 1F:
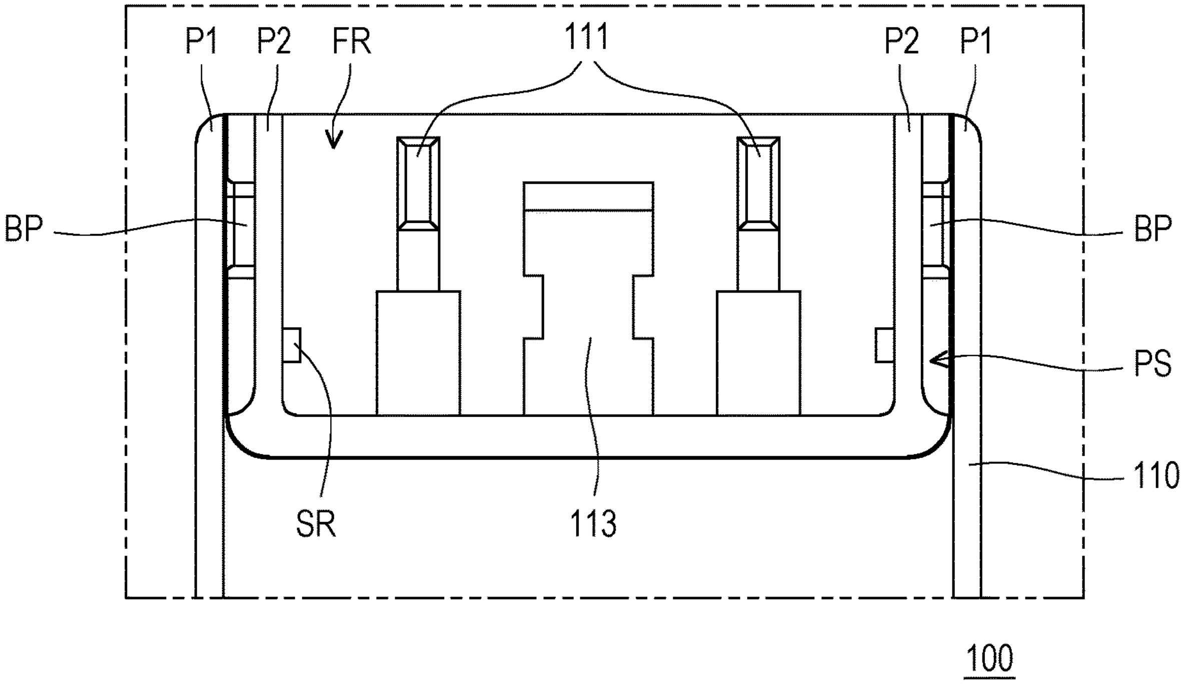
FIG. 1F is a schematic front view of a main body of FIG. 1A.
Figure 1G:
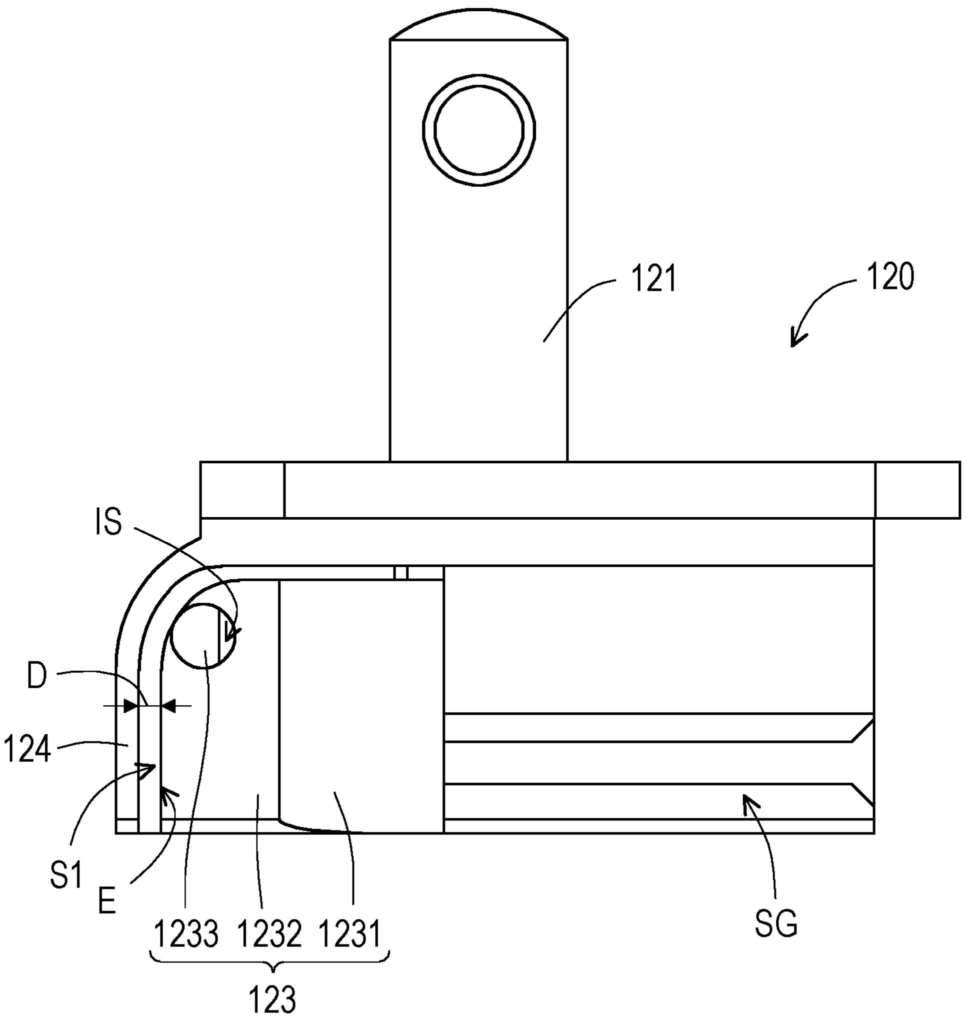
FIG. 1G is a schematic side view of a plug body of FIG. 1A.
Figure 1H:
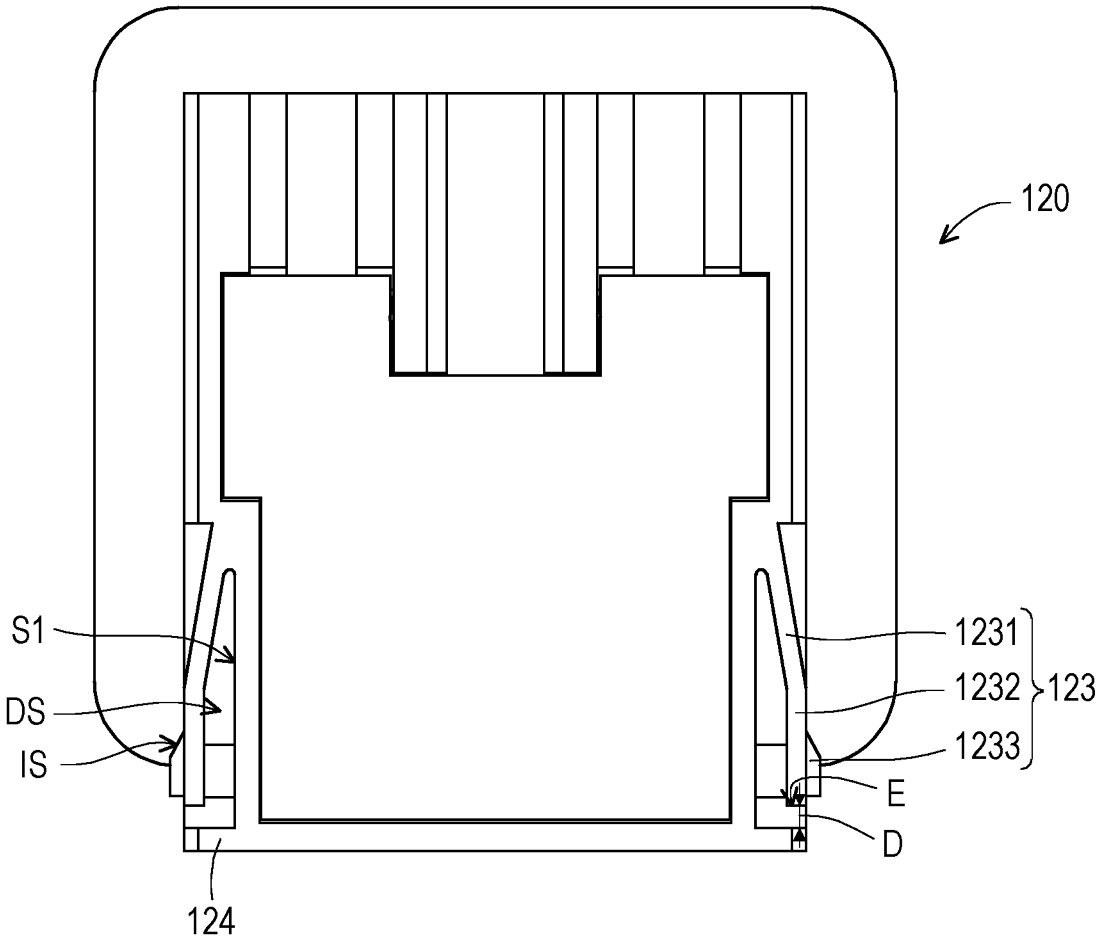
FIG. 1H is a schematic bottom view of the plug body of FIG. 1A.

FIG. 1C is a schematic exploded view of the electronic device with the detachable plug in FIG. 1A from another viewing angle. FIG. 1D is a schematic partial cross-sectional view of the electronic device with the detachable plug in FIG. 1A taken along a section line A-A'. FIG. 1E is a schematic view of a press action of the electronic device with the detachable plug of FIG. 1D. FIG. 1F is a schematic front view of a main body of FIG. 1A. FIG. 1G is a schematic side view of a plug body of FIG. 1A. FIG. 1H is a schematic bottom view of the plug body of FIG. 1A.

With reference to FIG. 1A to FIG. 1C, the electronic device 100 with the detachable plug of the disclosure includes a main body 110 and a plug body 120.

With reference of FIG. 1D and FIG. 1F together, the main body 110 has a fitting recess FR, a first conductive terminal group 111, and a press portion 112. The fitting recess FR is formed on a side of the main body 110, and the first conductive terminal group 111 is disposed in the fitting recess FR. The press portion 112 is located on at least one side of the fitting recess FR, and the press portion 112 is formed by at least one exterior side plate P1 and at least one interior side plate P2 of the main body 110 together. In this embodiment, the press portion 112 is located on two sides of the fitting recess FR, and the press portion 112 is formed by two exterior side plates P1 and two interior side plates P2 of the main body 110 together. In detail, the main body 110 is formed with the exterior side plates P1 and the interior side plates P2 separated from each other in a casing portion on the sides of the fitting recess FR, where each of the exterior side plates P1 and the corresponding interior side plate P2 may be disposed in parallel and maintain a distance, such that a press space PS exists between each of the exterior side plates P1 and the corresponding interior side plate P2 to form the press portion 112. In this embodiment, each of the interior side plates P2 has an opening OP communicating with the fitting recess FR, and each of the exterior side plates P1 has a bump BP passing through the corresponding opening OP. With reference to FIG. 1E together, after pressed by an external force F, each of the exterior side plates P1 is bent and approaches the corresponding interior side plate P2, such that each of the bumps BP passes through the corresponding opening OP and enters the fitting recess FR, and two press spaces PS are reduced at the same time. Operation relation between the press portion 112 and the plug body 120 is further described in the following paragraphs.

The plug body 120 is detachably configured in the fitting recess FR of the main body 110, where a width of the fitting recess FR is substantially equal to a width of the plug body 120 to facilitate the alignment and fixing of the plug body 120. The plug body 120 has a power pin group 121 and a second conductive terminal group 122 (illustrated in the cross-sectional view of FIG. 1D). The power pin group 121 protrudes from a top surface TS of the plug body 120, and the power pin group 121 may be used to be connected to a mains socket. The second conductive terminal group 122 is configured in the plug body 120 and is electrically coupled to the power pin group 121. With reference to FIG. 1A and FIG. 1D, the first conductive terminal group 111 is adapted to pass through the plug body 120 and be coupled with the second conductive terminal group 122 to accommodate the plug body 120 in the fitting recess FR. Thus, the plug body 120 and the main body 110 are integrally connected, such that the first conductive terminal group 111 is electrically coupled with the power pin group 121 through the second conductive terminal group 122. In some embodiments, each power pin in the power pin group 121 and the corresponding conductive terminal in the second conductive terminal group 122 may be independent from each other. In some embodiments, each power pin in the power pin group 121 and the corresponding conductive terminal in the second conductive terminal group 122 may be integrally formed.

In this embodiment, the second conductive terminal group 122 is made of an elastic material. When the first conductive terminal group 111 passes through the second conductive terminal group 122, the second conductive terminal group 122 undergoes elastic deformation to clamp the first conductive terminal group 111 to improve electrical connection reliability.

With reference to FIG. 1G and FIG. 1H, the plug body 120 is disposed with at least one elastic arm 123 corresponding to the press portion 112. In this embodiment, the plug body 120 has two elastic arms 123. An end of each of the elastic arms 123 is connected to an exterior wall surface S1 of the plug body 120, and a deformation space DS exists between each of the elastic arms 123 and the corresponding exterior wall surface S1. The elastic arm 123 is adapted to undergo elastic deformation in the deformation space DS. In this embodiment, the plug body 120 is disposed with a protruding portion 124 at a respective edge of two exterior wall surfaces S1. A front edge E of each of the elastic arms 123 is near the corresponding protruding portion 124, and a distance D exists between each of the elastic arms 123 and the corresponding protruding portion 124.

With reference to FIG. 1D, FIG. 1G, and FIG. 1H, each of the elastic arms 123 is further disposed with an elastic portion 1231, an abutting portion 1232, and a positioning block 1233. The elastic portion 1231 extends obliquely outward from the corresponding exterior wall surface S1. The abutting portion 1232 is formed at an end of the elastic portion 1231 away from the exterior wall surface S1 and parallel to the exterior wall surface S1. The positioning block 1233 is formed at the abutting portion 1232. When the plug body 120 is accommodated in the fitting recess FR, each of the positioning blocks 1233 is engaged in the corresponding opening OP and abuts against the corresponding bump BP. In addition, each of the abutting portions 1232 partially abuts the corresponding interior side plate P2, and each of the protruding portions 124 abuts against the edge of the corresponding interior side plate P2. With the positioning block 1233 of the plug body 120 engaged into the opening OP of the main body 110, the plug body 120 may be avoided from accidentally sliding out of the fitting recess FR during operation.

With reference to FIG. 1D, FIG. 1G, and FIG. 1H, each of the positioning blocks 1233 has an inclined surface IS. The inclined surface IS is obliquely formed at the abutting portion 1232 and is located on a side near the elastic portion 1231. In other words, the inclined surface IS is located on a side of the positioning block 1233 away from the protruding portion 124. While the plug body 120 is entering the fitting recess FR, each of the interior side plates P2 pushes each of the positioning blocks 1233 along the inclined surface IS to cause each of the elastic portions 1231 to be bent. At this time, each of the positioning blocks 1233 is adapted to enter the fitting recess FR along the corresponding interior side plate P2 until positioned into the opening OP. With the inclined surface IS, each of the positioning blocks 1233 and the corresponding interior side panel P2 do not block each other during insertion of the plug body 120. In addition, after the positioning block 1233 is positioned into the opening OP, the positioning block 1233 is no longer pushed by the interior side plate P2, such that the elastic deformation of the elastic portion 1231 may be restored to avoid elastic fatigue of the elastic arm 123 due to long-term use, which may thereby prolong the service life.

With reference to FIG. 1E, each of the exterior side plates P1 is adapted to be subject to the force F and approach the corresponding interior side plate P2, such that each of the bumps BP enters the fitting recess FR through the opening OP and pushes the corresponding positioning block 1233 away from the opening OP. At the same time, the elastic portion 1231 undergoes elastic deformation, such that each of the elastic arms 123 approaches the corresponding exterior wall surface S1. In this situation, the plug body 120 is adapted to slide along a horizontal direction PD to be separated from the fitting recess FR of the main body 110. In this embodiment, the horizontal direction PD may be parallel to the top surface TS of the plug body 120.

With reference to FIG. 1B, FIG. 1C, and FIG. 1G, the main body 110 has two sliding rails SR, respectively configured on two interior side plates P2. The plug body 120 has two sliding grooves SG, respectively configured on two exterior wall surfaces S1 of the plug body 120. The two sliding grooves SG slidably accommodate the two sliding rails SR, respectively. With the limiting relation between the sliding rail SR and the sliding groove SG, the plug body 120 is accommodated in or is separated from the fitting recess FR of the main body 110 along the horizontal direction PD.

With reference to FIG. 1B, FIG. 1C, and FIG. 1D, the main body 110 has a limiting block 113, configured in the fitting recess FR and located among the first conductive terminal group 111 (such as located between two conductive terminals), and a limiting groove 125 is formed on a side of the plug body 120 facing the first conductive terminal group 111. When the plug body 120 is accommodated in the fitting recess FR, the limiting block 113 of the main body 110 is fixed into the limiting groove 125 of the plug body 120, and the plug body 120 is thereby positioned in the fitting recess FR more firmly.

In short, with reference to FIG. 1A and FIG. 1B, the plug body 120 of the disclosure is adapted to enter the fitting recess FR of the main body 110 along the horizontal direction PD, and the two elastic arms 123 of the plug body 120 are respectively fixed to the two interior side plates P2 of the press portion 112 to engage the plug body 120 into the main body 110. With reference to FIG. 1D and FIG. 1E, when the plug body 120 is disassembled, the external force F is exerted on the two exterior side plates P1 of the press portion 112, such that the two exterior side plates P1 undergo elastic deformation and push the two elastic arms 123 to be separated from the two interior side plates P2, and the plug body 120 is thereby not engaged into the main body 110 to achieve the purpose of disassembling the plug body 120. Since the structure for engaging and separating is designed at an interior junction of the main body 110 and the plug body 120, rather than outside of the main body of the device, this hidden structure may improve product appearance and reduce water ingress.

Figure 2A:
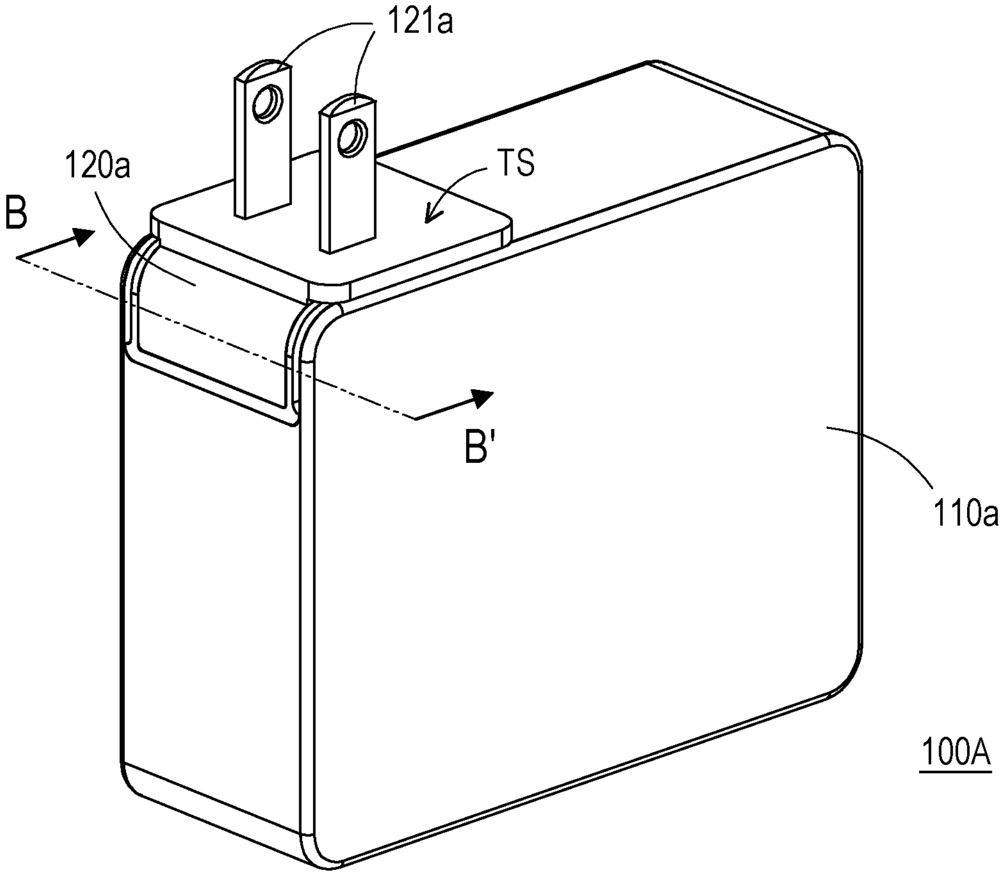
FIG. 2A is a schematic perspective view of an electronic device with a detachable plug according to another embodiment of the disclosure.
Figure 2B:
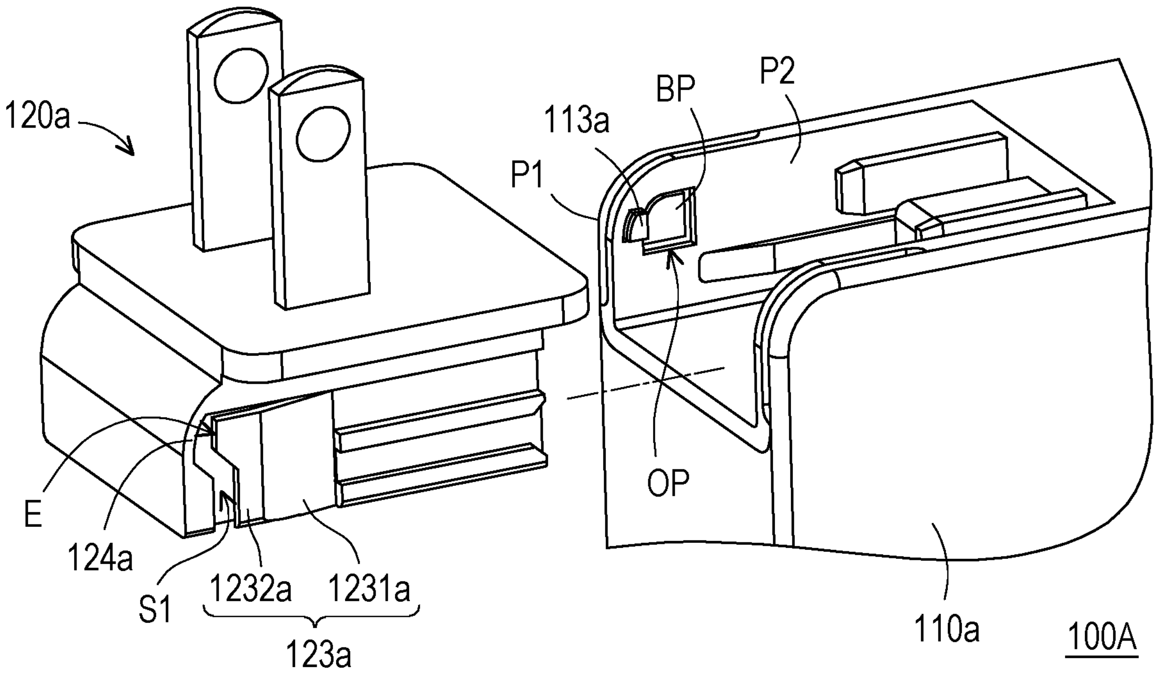
FIG. 2B is a schematic partial exploded view of the electronic device with the detachable plug in FIG. 2A.
Figure 2C:
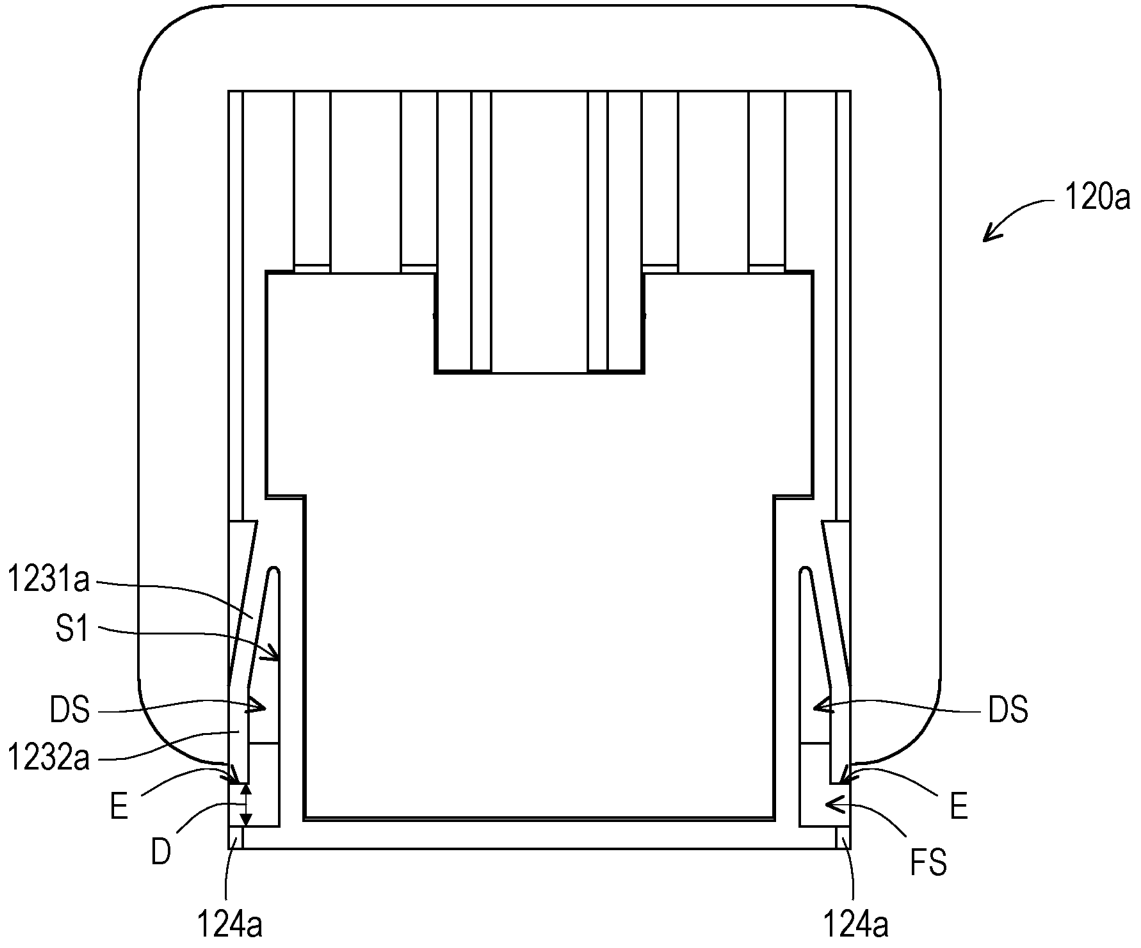
FIG. 2C is a schematic bottom view of a plug body of FIG. 2A.
Figure 2D:
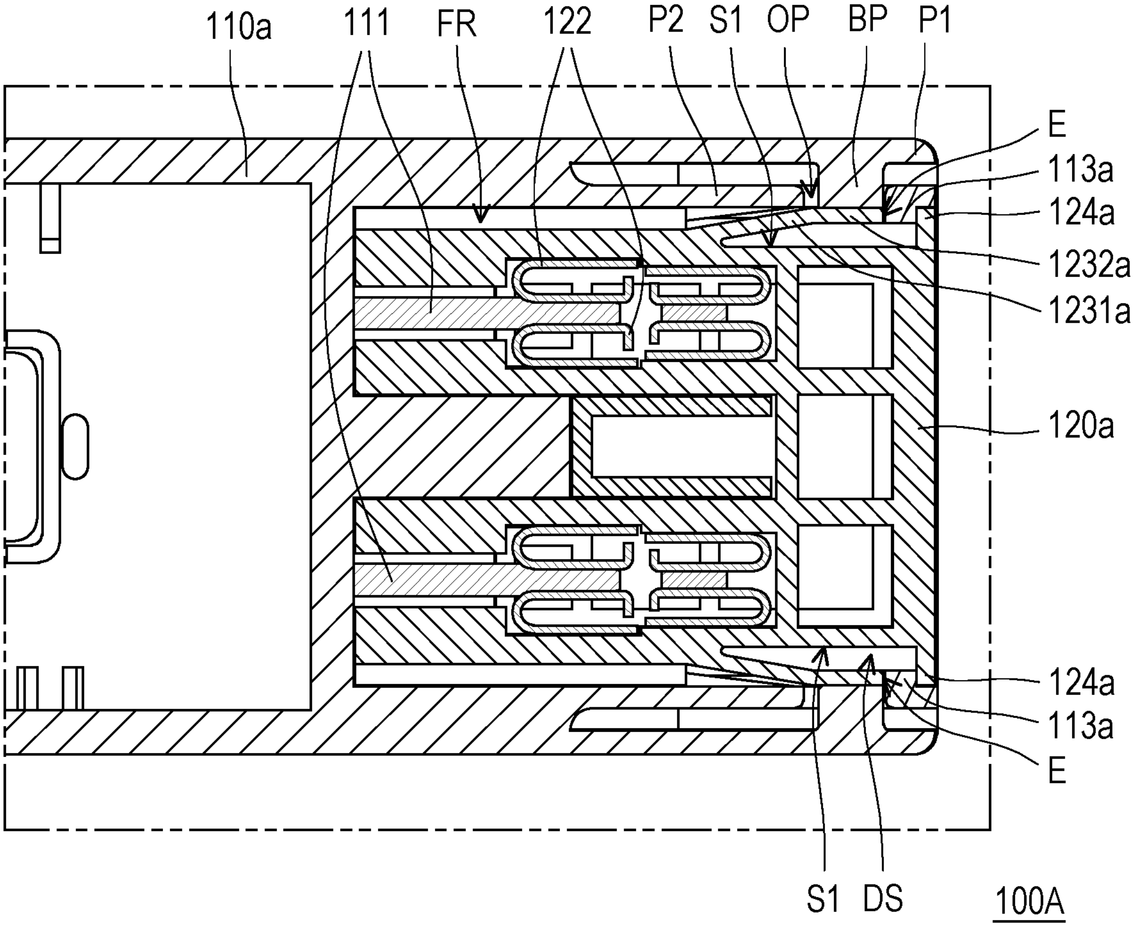
FIG. 2D is a schematic partial cross-sectional view of the electronic device with the detachable plug of FIG. 2A taken along a section line B-B'.
Figure 2E:
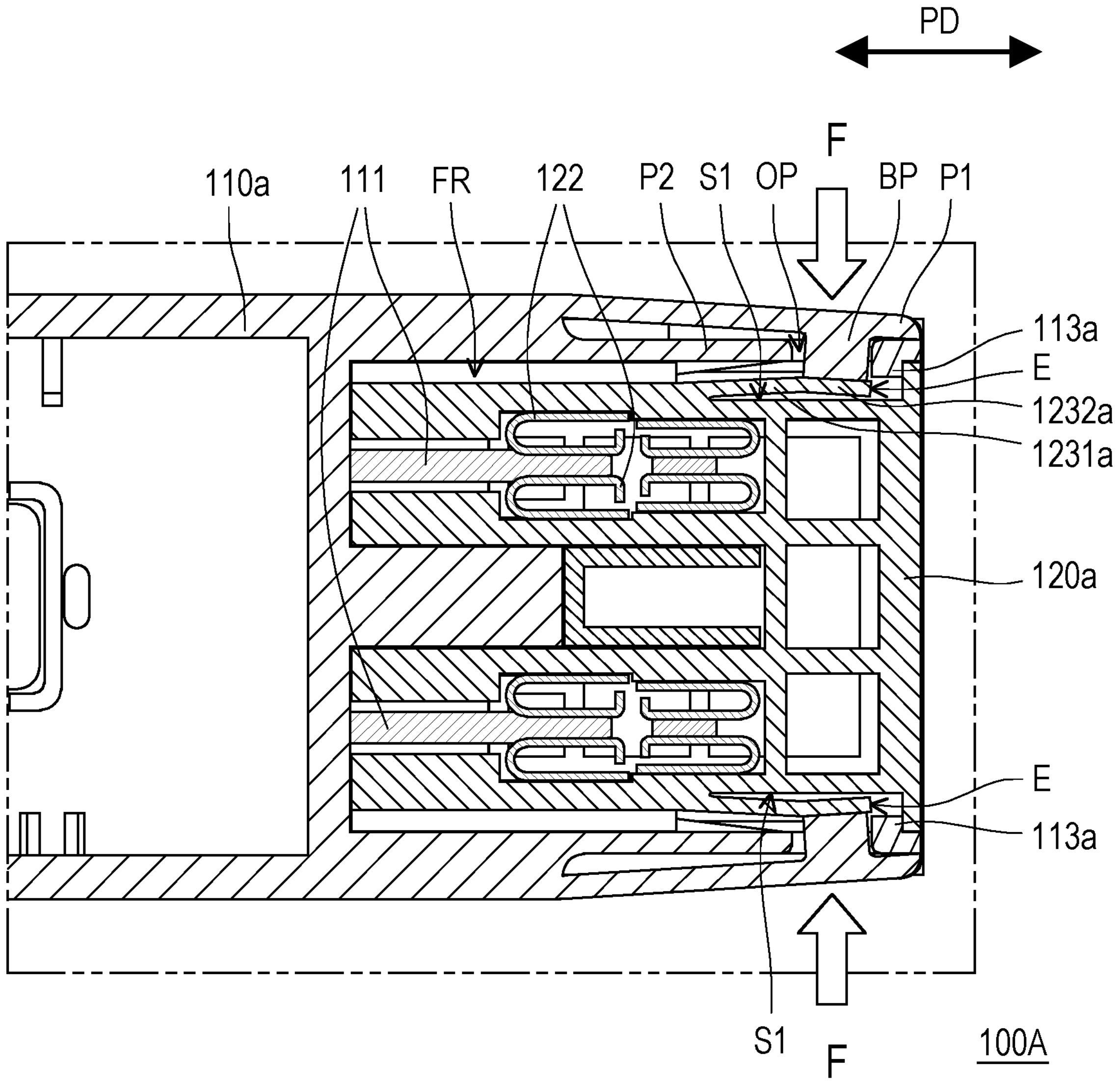
FIG. 2E is a schematic view of a press action of the electronic device with the detachable plug of FIG. 2D.

FIG. 2A is a schematic perspective view of an electronic device with a detachable plug according to another embodiment of the disclosure. FIG. 2B is a schematic partial exploded view of the electronic device with the detachable plug of FIG. 2A. FIG. 2C is a schematic bottom view of a plug body of FIG. 2A. FIG. 2D is a schematic partial cross-sectional view of the electronic device with a detachable plug of FIG. 2A along a section line B-B'. FIG. 2E is a schematic view of a press action of the electronic device with the detachable plug of FIG. 2D.

With reference to FIG. 2A and FIG. 2B, an electronic device 100A with a detachable plug of another embodiment of the disclosure is different from the electronic device 100 with the detachable plug of FIG. 1A. The difference between the two lies in that, with reference to FIG. 2B and FIG. 2D, a main body 110*a* has at least one fixing block 113*a*. In this embodiment, the main body 110*a* has two fixing blocks 113*a*, respectively configured on two inner side plates P2 and respectively near the corresponding opening OP. With reference to FIG. 2C and FIG. 2D, a plug body 120*a* is disposed with a protruding portion 124*a* at a respective edge of the two exterior wall surfaces S1. A front edge E of each of elastic arms 123*a* is near the corresponding protruding portion 124*a*, and a distance D exists between each of the elastic arms 123 and the corresponding protruding portion 124. Each of the distances D forms a fixing space FS. Each of the fixing spaces FS communicates with the corresponding deformation space DS. When the plug body 120*a* is accommodated in the fitting recess FR of the main body 110*a*, each of the fixing blocks 113*a* is engaged into the corresponding fixing space FS and abuts against the front edge E of the corresponding elastic arm 123*a*, and each of the protruding portions 124*a* abuts against the edge of the corresponding interior side plate P2. With the fixing block 113*a* of the main body 110*a* engaged into the fixing space FS of the plug body 120*a*, the plug body 120*a* may be avoided from accidentally sliding out of the fitting recess FR during operation.

Furthermore, with reference to FIG. 2C and FIG. 2D, each of the elastic arms 123*a* is disposed with an elastic portion 1231*a* and an abutting portion 1232*a*. The elastic portion 1231*a* extends obliquely outward from the corresponding exterior wall surface S1. The abutting portion 1232*a* is formed at an end of the elastic portion 1231*a* away from the exterior wall surface S1 and parallel to the exterior wall surface S1. When the plug body 120*a* is accommodated in the fitting recess FR, each of the abutting portions 1232*a* is aligned to the corresponding opening OP and abuts against the corresponding bump BP.

With reference to FIG. 2D and FIG. 2E, each of the exterior side plates P1 is adapted to be subject to the force F and approach the corresponding interior side plate P2, such that each of the bumps BP enters the fitting recess FR through the opening OP, pushes the corresponding elastic arm 123*a* toward the corresponding exterior wall surface S1, and causes the front edge E of each of the elastic arms 123*a* to be separated from the corresponding fixing block 113*a*. In this situation, the plug body 120*a* is adapted to slide along a horizontal direction PD to be separated from the fitting recess FR of the main body 110*a*.

Figure 3A:
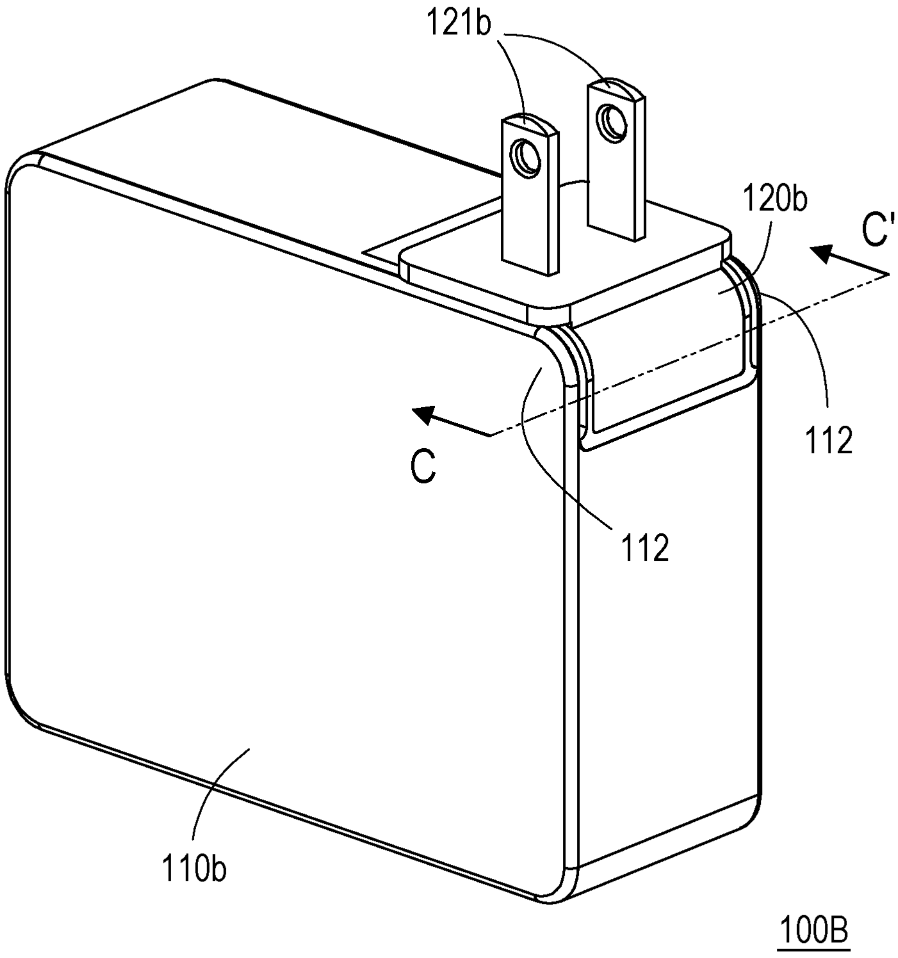
FIG. 3A is a schematic perspective view of an electronic device with a detachable plug according to another embodiment of the disclosure.
Figure 3B:
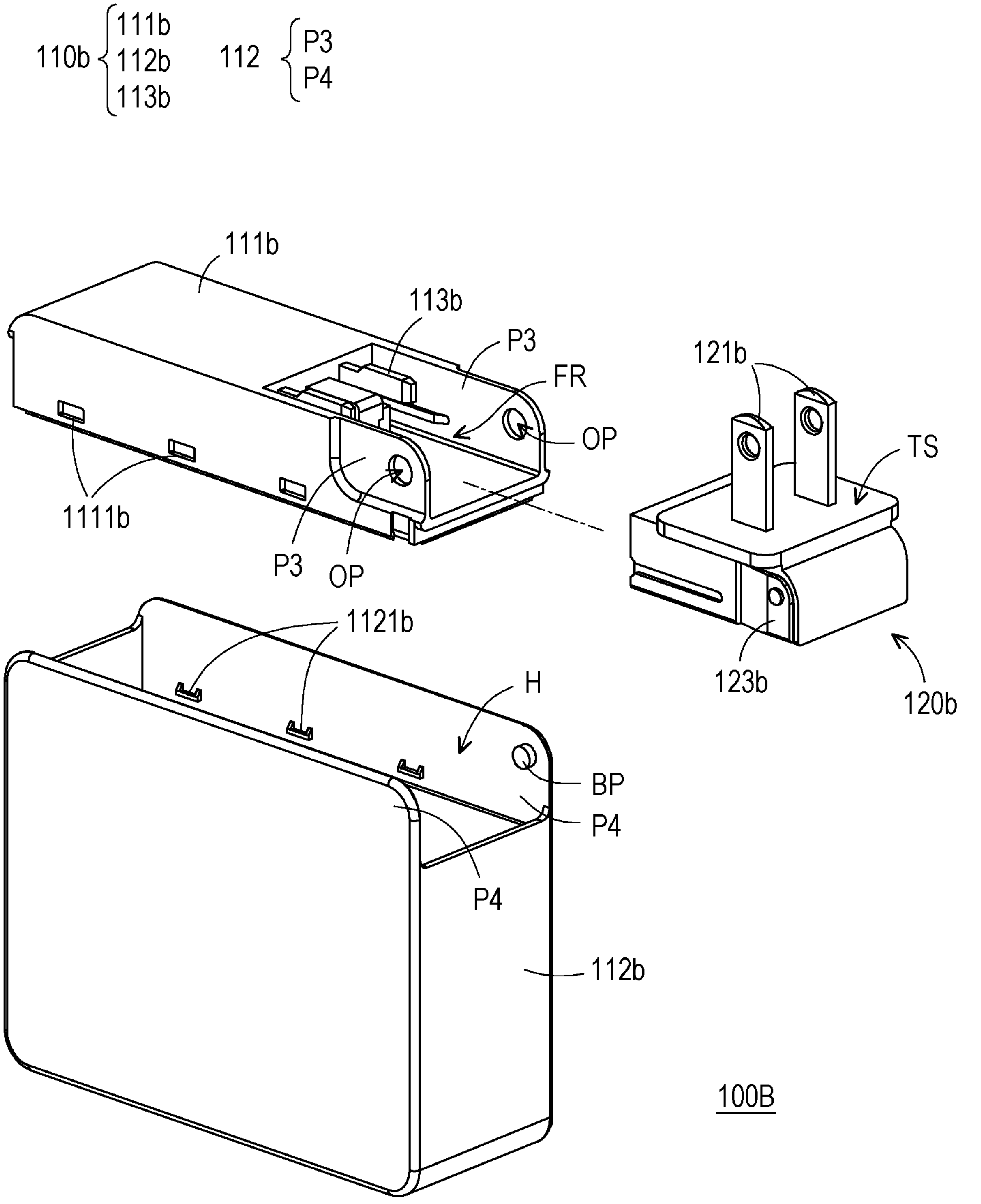
FIG. 3B is a schematic exploded view of the electronic device with the detachable plug in FIG. 3A.
Figure 3C:
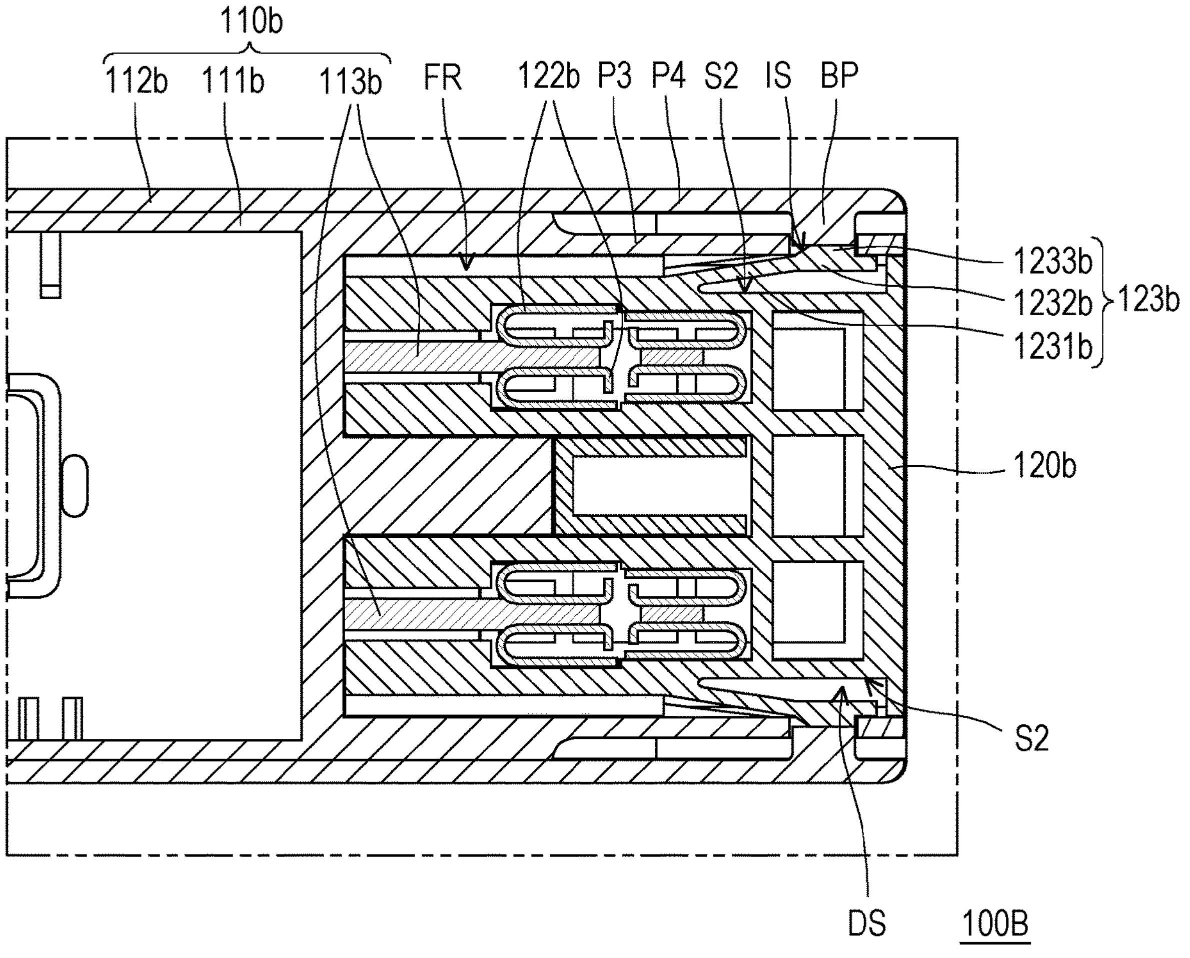
FIG. 3C is a schematic partial cross-sectional view of the electronic device with the detachable plug of FIG. 3A taken along a section line C-C'.
Figure 3D:
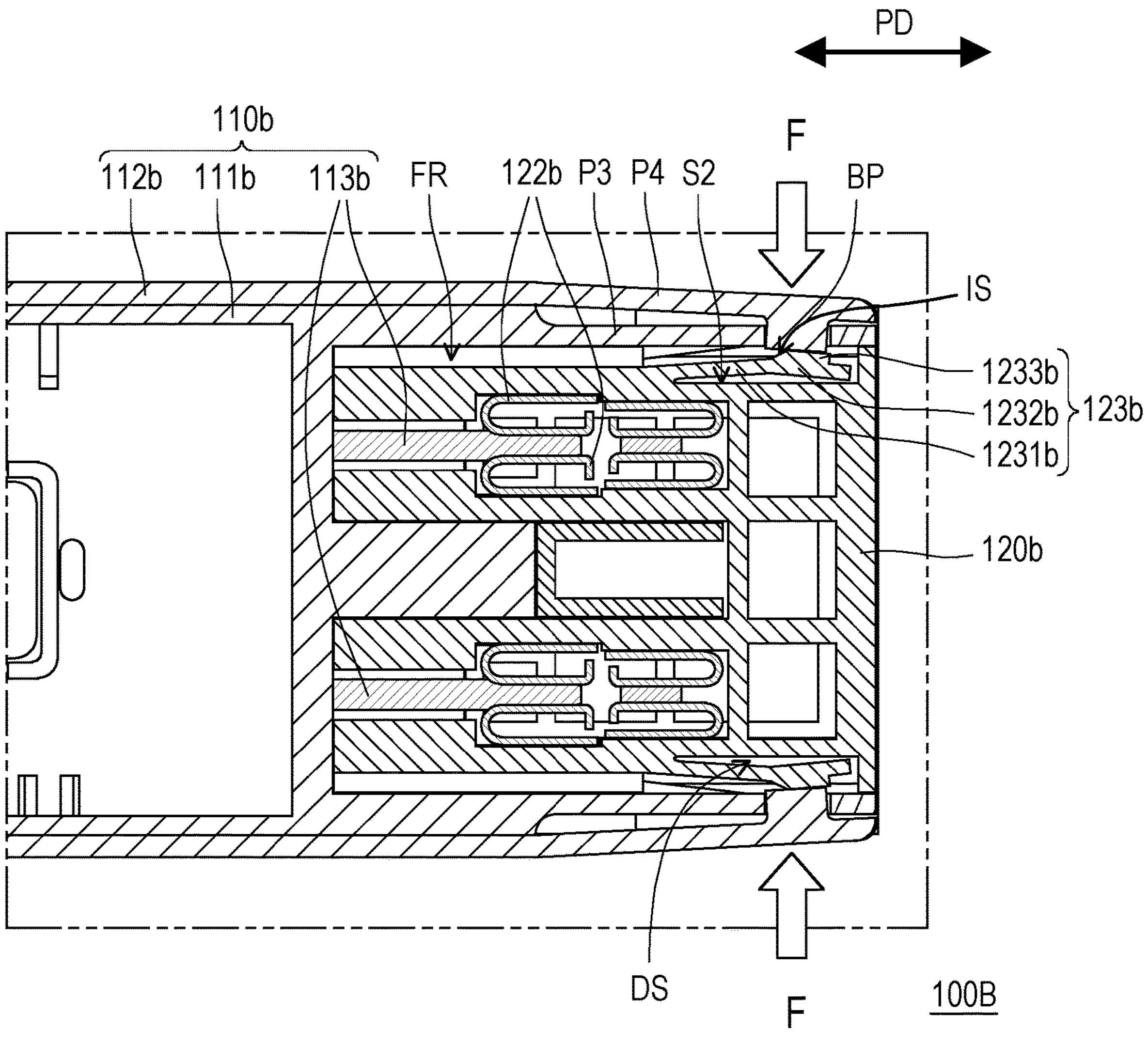
FIG. 3D is a schematic view of a press action of the electronic device with the detachable plug of FIG. 3C.

FIG. 3A is a schematic perspective view of an electronic device with a detachable plug according to another embodiment of the disclosure. FIG. 3B is a schematic exploded view of the electronic device with the detachable plug in FIG. 3A. FIG. 3C is a schematic partial cross-sectional view of the electronic device with the detachable plug of FIG. 3A taken along a section line C-C'. FIG. 3D is a schematic view of a press action of the electronic device with the detachable plug of FIG. 3C.

With reference to FIG. 3A to FIG. 3C, an electronic device 100B with a detachable plug of another embodiment of the disclosure is different from the electronic device 100 with the detachable plug of FIG. 1A. The difference between the two lies in that the electronic device with the detachable plug of the disclosure includes a main body 110*b* and a plug body 120*b*, wherein the main body 110*b* includes a plug assembly 111*b* and a casing 112*b*. The plug assembly 111*b* has a fitting recess FR and a first conductive terminal group 113*b*. The first conductive terminal group 113*b* is disposed in the fitting recess FR. The casing 112*b* has a hole H. The plug assembly 111*b* is configured in the hole H and is combined with the casing 112*b*.

With reference to FIG. 3B and FIG. 3C, at least one first side plate P3 of the plug assembly 111*b* has an opening OP communicating with the fitting recess FR, and at least one second side plate P4 of the casing 112*b* has a bump BP. In this embodiment, two first side plates P3 of the plug assembly 111*b* respectively have the opening OP communicating with the fitting recess FR, and two second side plates P4 of the casing 112*b* respectively have the bump BP. When the plug assembly 111*b* is combined with the casing 112*b*, each of the bumps BP passes through the corresponding opening OP. In this embodiment, the press portion 112 is located on two sides of the fitting recess FR, and the press portion 112 is formed by two first side plates P3 and two second side plates P4 together. In detail, each of the first side plates P3 and the corresponding second side plate P4 may be disposed in parallel, and each of the first side plates P3 and the corresponding second side plate P4 are separated from each other by a distance on the side of the fitting recess FR, such that the press space PS exists between each of the first side plates P3 and the corresponding second side plate P4 to form the press portion 112.

Furthermore, with reference to FIG. 3B, the plug assembly 111*b* has multiple buckling grooves 1111*b*, configured on two first side plates P3. The casing 112*b* has multiple buckling members 1121*b*, configured on two second side plates P4. When the plug assembly 111*b* is combined with the casing 112*b*, each of the buckling members 1121*b* is engaged with the corresponding buckling groove 1111*b*. In short, the main difference between this embodiment and the embodiment shown in FIG. 1A lies in that the main body 110*b* of this embodiment includes the plug assembly 111*b* and the casing 112*b* engaged and combined with each other, while the portion corresponding to the casing 112 of the main body 110 of the embodiment shown in FIG. 1A may be one single component or be integrally formed.

With reference to FIG. 3A to FIG. 3C, the plug body 120*b* is detachably configured in the fitting recess FR of the plug assembly 111*b*, where a width of the fitting recess FR is substantially equal to a width of the plug body 120*b* to facilitate the alignment and fixing of the plug body 120*b*. The plug body 120*b* has a power pin group 121*b* and a second conductive terminal group 122*b* (illustrated in the cross-sectional view of FIG. 3C). The power pin group 121*b* protrudes from a top surface TS of the plug body 120*b*, and the power pin group 121*b* may be used to be connected to a mains socket. The second conductive terminal group 122*b* is configured in the plug body 120*b* and is electrically coupled to the power pin group 121*b*.

With reference to FIG. 3C and FIG. 3D, the plug body 120*b* is disposed with at least one elastic arm 123*b*. In this embodiment, the plug body 120*b* has two elastic arms 123*b*. An end of each of the elastic arms 123*b* is connected to an exterior wall surface S2 of the plug body 120*b*, and a deformation space DS exists between each of the elastic arms 123*b* and the corresponding exterior wall surface S2. Each of the elastic arms 123*b* is adapted to undergo elastic deformation in the deformation space DS.

Furthermore, each of the elastic arms 123*b* is disposed with an elastic portion 1231*b*, an abutting portion 1232*b*, and a positioning block 1233*b*. The elastic portion 1231*b* extends obliquely outward from the corresponding exterior wall surface S2. The abutting portion 1232*b* is formed at an end of the elastic portion 1231*b* away from the exterior wall surface S2 and parallel to the exterior wall surface S2. The positioning block 1233*b* is formed at the abutting portion 1232*b*. When the plug body 120*b* is accommodated in the fitting recess FR, each of the positioning blocks 1233*b* is engaged in the corresponding opening OP and abuts against the corresponding bump BP, and each of the abutting portions 1232*b* partially abuts the corresponding first side plate P3.

With reference to FIG. 3B and FIG. 3C, each of the positioning blocks 1233*b* has an inclined surface IS. The inclined surface IS is obliquely formed at the abutting portion 1232*b* and is located on a side near the elastic portion 1231*b*. While the plug body 120*b* is entering the fitting recess FR, each of the first side plates P3 pushes each of the positioning blocks 1233*b* along the inclined surface IS to cause each of the elastic portions 1231*b* to be bent. At this time, each of the positioning blocks 1233*b* is adapted to enter the fitting recess FR along the corresponding first side plate P3 until positioned into the opening OP without blocking or being blocked by the corresponding first side plate P3. In addition, after the positioning block 1233*b* is positioned into the opening OP, the elastic deformation of the elastic portion 1231*b* may be restored to avoid elastic fatigue of the elastic arm 123*b* due to long-term use, which may thereby prolong the service life.

With reference to FIG. 3C and FIG. 3D, each of the second side plates P4 is adapted to be subject to a force to approach the corresponding first side plate P3, such that each of the bumps BP enters the fitting recess FR through the corresponding opening OP and pushes the corresponding positioning block 1233*b* away from the corresponding opening OP. At the same time, the elastic portion 1231*b* undergoes elastic deformation, such that each of the elastic arms 123*b* approaches the corresponding exterior wall surface S2.

In this situation, the plug body 120*b* is adapted to slide along a horizontal direction PD to be separated from the fitting recess FR of the main body 110*b*.

In other embodiments, the main body 110*a* of the embodiment shown in FIG. 2A and FIG. 2B may also use the plug assembly and the casing that are assembled in the embodiment of FIG. 3B, such that the main body 110*a* may replace a damaged plug assembly or casing. Reference may be made to the previous embodiments for related description, and details are not described herein.

Figure 4A:
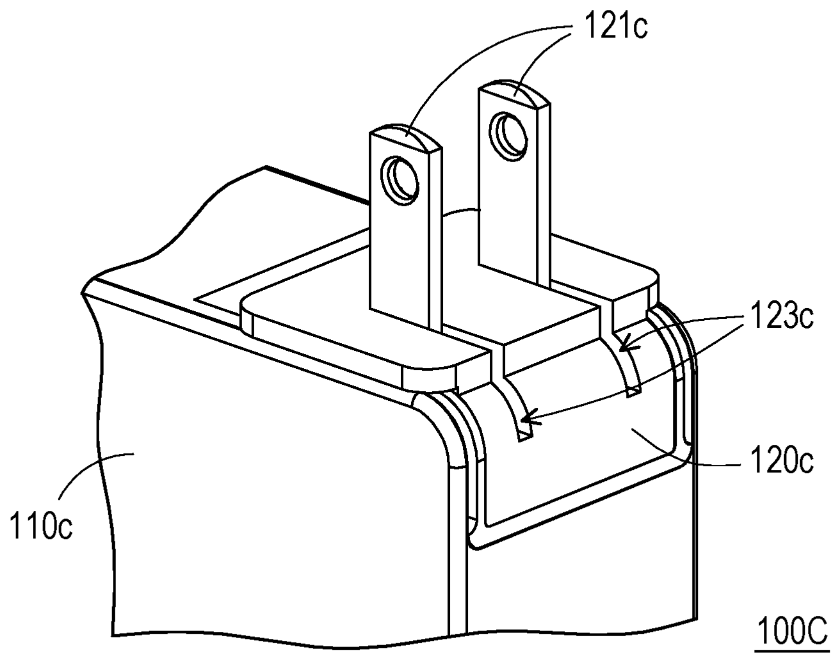
FIG. 4A is a schematic perspective view of an electronic device with a detachable plug according to another embodiment of the disclosure.
Figure 4B:
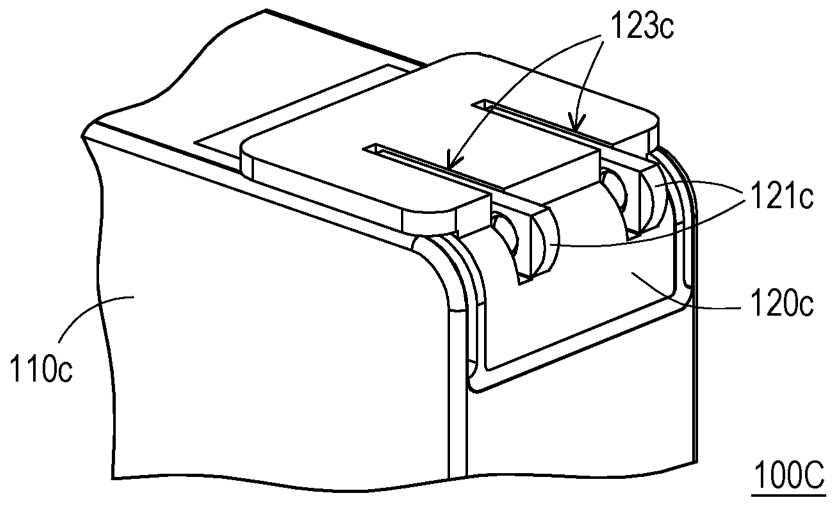
FIG. 4B is a schematic perspective view of a storage state of a plug body of FIG. 4A.

FIG. 4A is a schematic perspective view of an electronic device with a detachable plug according to another embodiment of the disclosure. FIG. 4B is a schematic perspective view of a storage state of a plug body of FIG. 4A.

With reference to FIG. 4A and FIG. 4B, an electronic device 100C with a detachable plug of this embodiment includes a main body 110*c* and a plug body 120*c*. The difference between this embodiment and the previous embodiments lies in that the plug body 120*c* has a power pin group 121*c* and multiple storage grooves 123*c*. The power pin group 121*c* is rotatably configured at the plug body 120*c*. With reference to FIG. 4A, in the use state, the power pin group 121*c* protrudes from the storage grooves 123*c* of the plug body 120*c*, and the power pin group 121*c* is used to be connected to a mains socket. With reference to FIG. 4B, in the storage state, the power pin group 121*c* rotates relative to the plug body 120*c* and enters the storage grooves 123*c* to facilitate reduction of the volume.

Figure 5A:
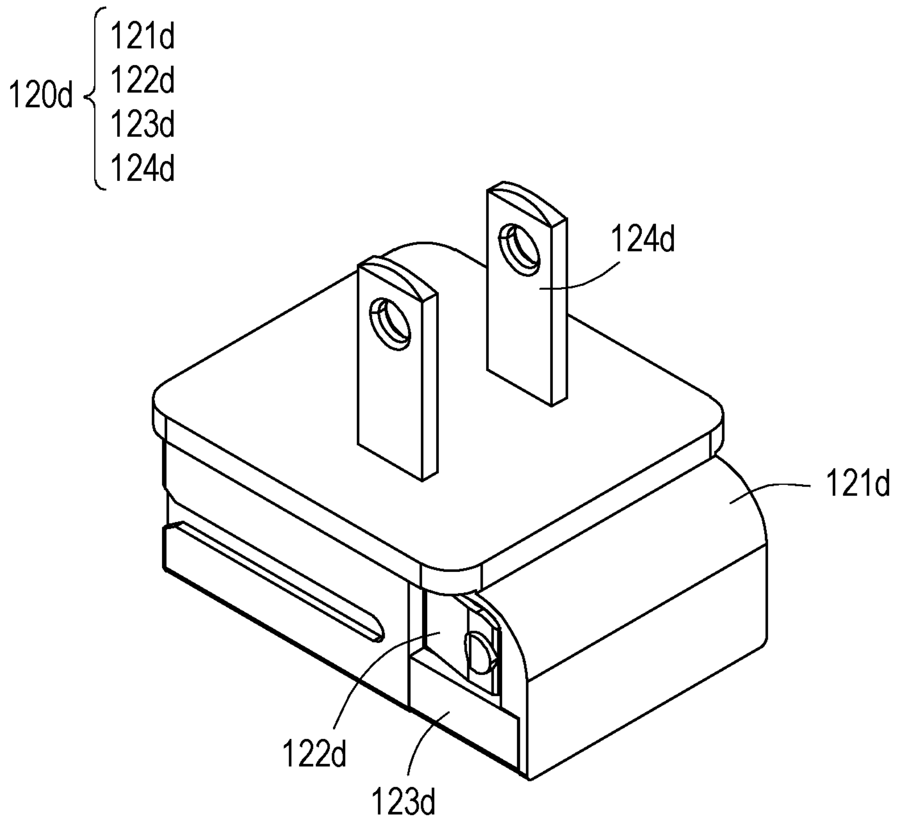
FIG. 5A is a schematic perspective view of a plug body according to another embodiment of the disclosure.
Figure 5B:
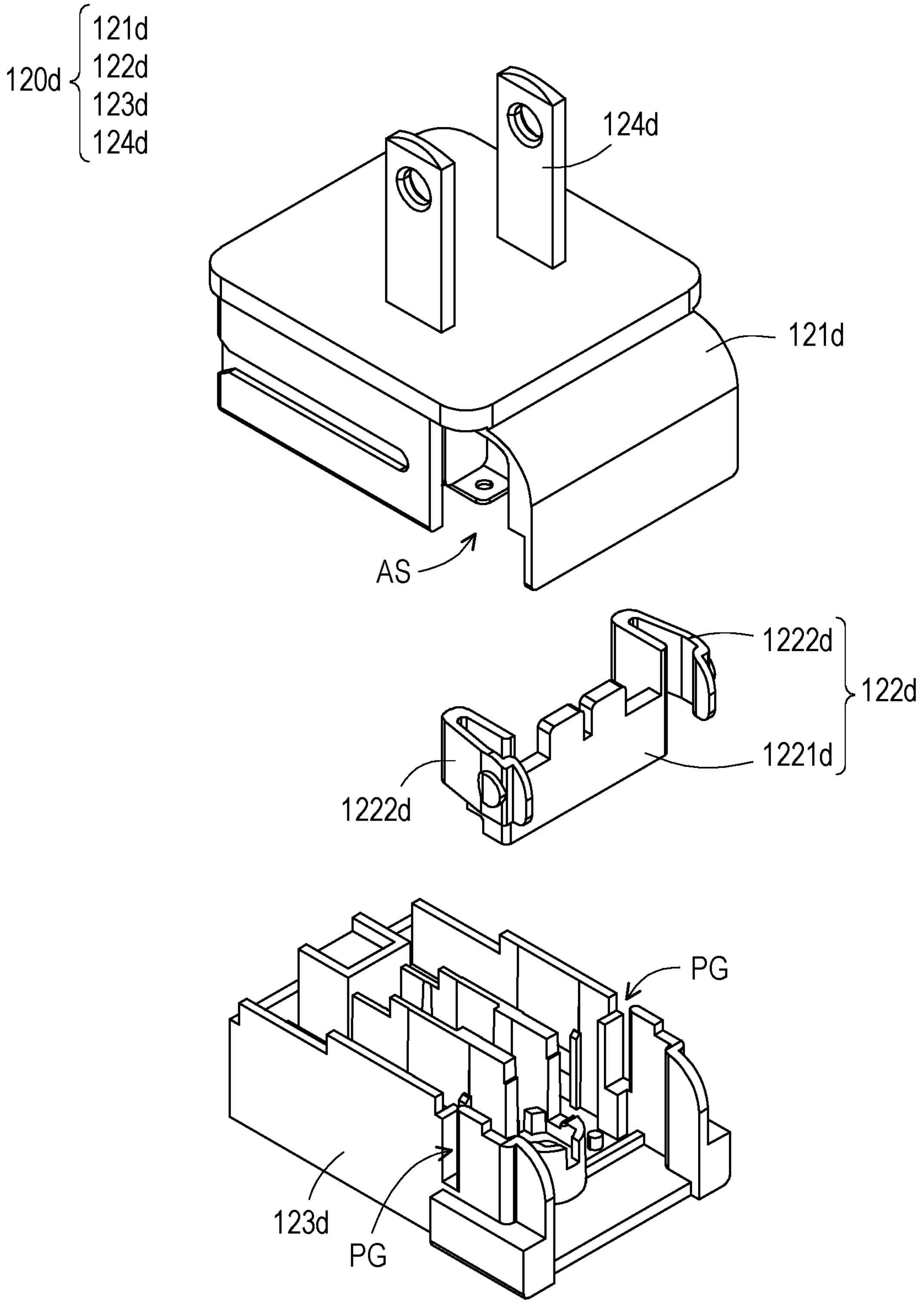
FIG. 5B is a schematic exploded view of the plug body in FIG. 5A.

FIG. 5A is a schematic perspective view of a plug body according to another embodiment of the disclosure, and FIG. 5B is a schematic exploded view of the plug body in FIG. 5A.

With reference to FIG. 5A and FIG. 5B, a plug body 120*d* of this embodiment has a first casing 121*d*, an elastic arm structural member 122*d*, and a second casing 123*d*. A power pin group 124*d* protrudes from a top surface TS of the first casing 121*d*, and the elastic arm structural member 122*d* is disposed between the first casing 121*d* and the second casing 123*d*. The elastic arm structural member 122*d* has a positioning portion 1221*d* and two elastic arms 1222*d*. The two elastic arms 1222*d* are connected to two opposite sides of the positioning portion 1221*d*, and the two elastic arms 1222*d* are bent and extended from the positioning portion 1221*d*. The elastic arm 1222*d* of the elastic arm structural member 122*d* is similar to the elastic arm 123 (or the elastic arm 123*a*) of the previous embodiment, and details are not described herein. In detail, the first casing 121*d* has an accommodating space AS. When the plug body 120*d* is assembled, the second casing 123*d* is disposed in the accommodating space AS to clamp the elastic arm structural member 122*d*, the positioning portion 1221*d* of the elastic arm structural member 122*d* is engaged in the first casing 121*d* and the second casing 123*d*, and the connecting position between each elastic arm 1222*d* and the positioning portion 1221*d* (i.e., the bending position) is engaged in a groove PG on the side of the second casing 123*d*, such that the two elastic arms 1222*d* extend out of the second casing 123*d* from the grooves PG. As shown in FIG. 5A and FIG. 5B, the first casing 121*d* is provided with openings at the positions corresponding to the elastic arms 1222*d*, such that the elastic arms 1222*d* may be exposed from the plug body 120*d* in order to fix the plug body 120*d* to the main body or disassemble the plug body 120*d* from the main body. In this embodiment, the elastic arm structural member 122*d*, the first casing 121*d*, and the second casing 123*d* are separately designed, which may reduce the difficulty of component manufacturing and maintain assembly convenience.

In summary, the electronic device with the detachable plug of the disclosure has the plug body detachably configured in the fitting recess of the main body and may replace plug bodies of corresponding specifications according to requirements to be applicable to mains sockets of different specifications. In addition, the main body and the plug body of the disclosure adopt a hidden connection structure, which may improve product appearance and reduce water ingress.

What is claimed is:

1. An electronic device with a detachable plug, comprising:

a main body, having a fitting recess, a first conductive terminal group, and a press portion, the first conductive terminal group disposed in the fitting recess, the press portion located on at least one side of the fitting recess, and the press portion formed by at least one exterior side plate and at least one interior side plate of the main body together, wherein a press space exists between the at least one exterior side plate and the at least one interior side plate, the at least one interior side plate has an opening communicating with the fitting recess, and the at least one exterior side plate has a bump passing through the opening; and a plug body, detachably configured in the fitting recess of the main body, the plug body having a power pin group and a second conductive terminal group, the power pin group protruding from a top surface of the plug body, and the second conductive terminal group configured in the plug body and electrically coupled to the power pin group, wherein the first conductive terminal group is adapted to pass through the plug body and be coupled with the second conductive terminal group to accommodate the plug body in the fitting recess.

2. The electronic device with the detachable plug according to claim 1, wherein the plug body is disposed with an elastic arm corresponding to the press portion, an end of the elastic arm is connected to an exterior wall surface of the plug body, and a deformation space exists between the elastic arm and the exterior wall surface.

3. The electronic device with the detachable plug according to claim 2, wherein the elastic arm is disposed with a positioning block, and the positioning block is engaged in the opening when the plug body is accommodated in the fitting recess.

4. The electronic device with the detachable plug according to claim 3, wherein the at least one exterior side plate is adapted to be forced to approach the at least one interior side plate, such that the bump enters the fitting recess through the opening, pushes the positioning block away from the opening, and causes the elastic arm to approach the exterior wall surface.

5. The electronic device with the detachable plug according to claim 2, wherein the plug body is disposed with a protruding portion at an edge of the exterior wall surface, and a front edge of the elastic arm is near the protruding portion and is separated from the protruding portion by a distance.

6. The electronic device with the detachable plug according to claim 5, wherein the main body has a fixing block, configured on the at least one interior side plate and near the opening corresponding thereto.

7. The electronic device with the detachable plug according to claim 6, wherein the distance forms a fixing space, the fixing space communicates with the deformation space, and the fixing block is engaged in the fixing space and abuts against the front edge of the elastic arm when the plug body is accommodated in the fitting recess.

8. The electronic device with the detachable plug according to claim 7, wherein the at least one exterior side plate is adapted to be forced to approach the at least one interior side plate, such that the bump enters the fitting recess through the opening, pushes the elastic arm toward the exterior wall surface, and causes the front edge of the elastic arm to be separated from the fixing block.

9. The electronic device with the detachable plug according to claim 1, wherein the plug body has a first casing, an elastic arm structural member, and a second casing, the power pin group protrudes from the top surface of the first casing, and the elastic arm structural member is disposed between the first casing and the second casing.

10. The electronic device with the detachable plug according to claim 9, wherein the elastic arm structural member has a positioning portion and two elastic arms, the two elastic arms are connected to two opposite sides of the positioning portion, the first casing has an accommodating space, the second casing is disposed in the accommodating space to clamp the elastic arm structural member, the positioning portion is engaged in the first casing and the second casing, and the two elastic arms extend out of the second casing.

11. An electronic device with a detachable plug, comprising:

a main body, comprising:

a plug assembly, having a fitting recess and a first conductive terminal group, the first conductive terminal group disposed in the fitting recess, at least one first side plate of the plug assembly having an opening communicating with the fitting recess; and a casing, having a hole, the plug assembly disposed in the hole and combined with the casing, wherein at least one second side plate of the casing has a bump, and when the plug assembly is combined with the casing, the bump passes through the opening, and a press space exists between the at least one first side plate and the at least one second side plate; and a plug body, detachably configured in the fitting recess of the plug assembly and comprising:

a power pin group, protruding from a top surface of the plug body; and a second conductive terminal group, configured in the plug body and electrically coupled to the power pin group.

12. The electronic device with the detachable plug according to claim 11, wherein a width of the fitting recess is substantially equal to a width of the plug body.

13. The electronic device with the detachable plug according to claim 11, wherein the plug body is disposed with an elastic arm, an end of the elastic arm is connected to an exterior wall surface of the plug body, and a deformation space exists between the elastic arm and the exterior wall surface.

14. The electronic device with the detachable plug according to claim 13, wherein the elastic arm is disposed with a positioning block, and the positioning block is engaged in the opening when the plug body is accommodated in the fitting recess.

15. The electronic device with the detachable plug according to claim 14, wherein the at least one second side plate is adapted to be forced to approach the at least one first side plate, such that the bump enters the fitting recess through the opening, pushes the positioning block away from the opening, and causes the elastic arm to approach the exterior wall surface.

* * * * *